Figure 1:
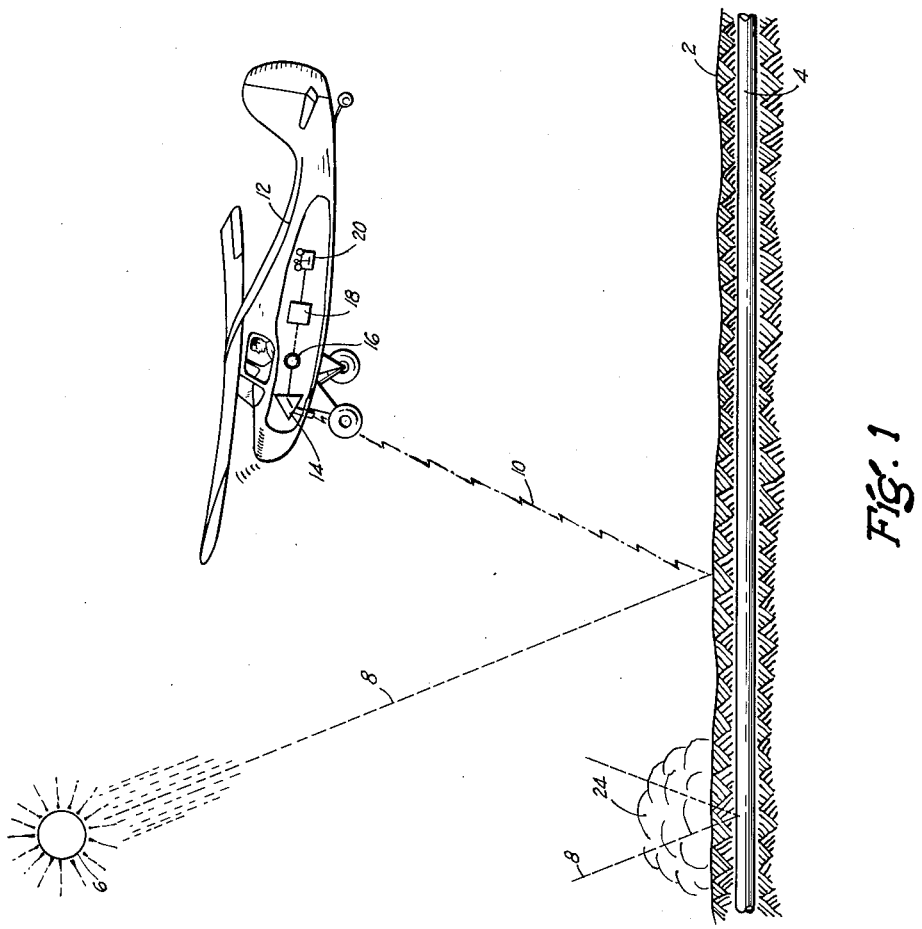

May 1, 1962 G. ROMANS 3,032,655
METHOD OF DETECTING PIPE LINE LEAKS
Filed March 5, 1958

INVENTOR.
Gleason Romans
BY
C. M. McKnight
ATTORNEY

United States Patent Office 3,032,655
Patented May 1, 1962

3,032,655
METHOD OF DETECTING PIPE LINE LEAKS
Gleason Romans, P.O. Box 8447, Tulsa, Okla.
Filed Mar. 5, 1958, Ser. No. 719,377
3 Claims. (Cl. 250—43.5)

This present invention relates generally to a method of detecting hydrocarbon leakage from pipe lines, and more particularly, but not by way of limitation, the invention concerns the detection of hydrocarbon gas leakage from underground pipe lines from an airborne position.

The present day system of pipe lines is quite large for transporting hydrocarbon products, both liquid and gases, in all parts of the country, as well as from field installations to refineries. As a consequence, in the transcontinental, as well as pipe lines of lesser length, a constant surveillance of the pipe lines must be maintained in order to observe any leaks from the hydrocarbon fluids therein. The most modern way of determining these leaks is to patrol the terrain of the pipe line by an aviation patrol, wherein a small airplane flies along the path of the buried pipe line attempting to observe a hydrocarbon cloud, which usually emits from the pipe when there is a leakage. This method is somewhat inefficient because it is difficult to visually observe many leaks which are constantly occurring. Furthermore, such airborne patrol necessitates flying the airplane quite close to the natural terrain of the ground during all kinds of weather conditions and in many instances, it is very dangerous.

This invention is generally concerned with detecting a hydrocarbon fluid leak in an underground pipe line by measuring the absorption of infra-red radiation on a selected wave length, and more particularly where the infra-red radiation is absorbed by the leaking hydrocarbon fluid. Such absorption is caused to be indicated visibly or audibly from an airborne position to immediately determine the terrain location of the leak in the underground pipe line.

It is an important object of this invention to provide a simple method for rapidly and efficiently detecting hydrocarbon fluid leaks in the underground pipe line.

Still another object of this invention is to provide for efficiently detecting hydrocarbon leaks in underground pipe lines from an airborne position.

And still another object of this invention is to provide a method for detecting hydrocarbon fluid leaks in underground pipe lines through absorption of infra-red radiation of a selected wave length by the leaking hydrocarbon fluid cloud emitting from the pipe line.

Other objects and advantages of the invention will be evident from the following detailed description, read in conjunction with the accompanying drawings, which illustrate my invention.

In the drawings:

FIGURE 1 is a schematic view with certain parts in section depicting the general lay-out of the testing method.

Referring to the drawings in detail, reference character 2 represents the surface of the underground which a pipe line 4 is buried therein, usually a short distance such as three to six feet. Such pipe lines usually extend great distances to convey hydrocarbon products, such as gaseous fluids and the like, from field installations to the refineries, as well as interstate transportation thereof. The pipe lines will develop leaks due to corrosion and other causes and in such event, the hydrocarbon products being conveyed therein will leak, and thus will cause great damage if not detected. Modern methods of detecting these leaks is usually by pipe line patrol through an airplane.

The present method is concerned with utilizing the sun such as 6 as a source of emitting infra-red rays, wherein these rays are projected along a path 8 toward the earth or ground 2. Under normal ground conditions, the infra-red rays projecting from the sun 6 are reflected upwardly from the ground along a path 10 in order to be picked up by an airplane 12 as it flies in patrol operation of the pipe line. The airplane may carry a suitable crystal or filter 14 which is selected particularly to eliminate all other frequencies other than infra-red radiation on a 3.4 micron wave length. The filter 14 thus permits only radiation of infra-red rays on a 3.4 micron wave length to pass through the filter. It has been found that infra-red radiation on the 3.4 micron wave length will be absorbed by hydrocarbons. Consequently, with the sun as a source of infra-red rays projecting infra-red rays to the ground, and these rays are reflected by the path 10 back into the atmosphere, as long as there is a suitable source of the infra-red energy passing through the crystal on the selected wave length, it will go on to the detector 16, and the current in turn is relayed on to an amplifier 18 and a signalling device 20. The detector is preferably made of materials that are sensitive to the infra-red rays on this frequency. Such materials being lead sulphide, plumbite, selenide, but not limited thereto, which permit the current to pass on to the amplifier and signalling device and provide a balanced condition thereof.

The airplane flies above the pipe line 4, and the infra-red radiation is permitted to pass through the detector, amplifier and signalling device, so they will be balanced with a second similar device (not shown) which operates on another frequency. Consequently, no signal is emitted from the apparatus in said balanced condition, thus indicating that the infra-red radiation is present and not being absorbed by any hydrocarbon gases or the like in the scanning field along the path 10. However, when a leak in the pipe line 4 is present and thus emits a hydrocarbon gas cloud 24, the infra-red radiation moving along the reflected path 8 will be absorbed by the leaking hydrocarbon gases. In this condition, the infra-red energy reflected along the path 10 to the crystal 14 will not include infra-red radiation on a 3.4 micron wave length, since they have been absorbed by the hydrocarbon gas cloud. This condition creates an unbalanced state in the current for the amplifier 18 and the signal 20, whereby the signal 20 will be activated to either audibly or visibly indicate the absence of the infra-red radiation. The audible or visible indication may be made by any suitable means (not shown). As soon as the signal 20 indicates the lack of infra-red radiation, such is indicative of a leak in the underground pipe 4. In such instances, the ground 2 adjacent the leak or in proximity with the leak in the pipe 4 may be marked by any suitable means, such as by dropping a flag, a flare or the like (not shown) so that the leak in the pipe line 4 may be readily ascertained by the ground crew upon being informed thereof.

It will thus be seen that the present invention provides a method for rapidly detecting leaks from an airborne position. Once the existence of the leak is known in the underground pipe by the audible indication of the equipment in the airplane, it is a simple matter to radio the home station of the approximate location, and that physical means have been dropped in proximity of the leaking pipe line so that the leak may be repaired expeditiously.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. The method of detecting leaks in underground pipe lines containing hydrocarbon products by utilizing the infra-red radiation from a solar source projected in proximity of the pipe line, filtering a first portion of the reflected infra-red radiation from an airborne position on a 3.4 micron wave length capable of absorption by any leaking hydrocarbons from the pipe line, filtering a second portion of the reflected infra-red radiation from an airborne position on another wave length, directing said first and second filtered portions to a signalling device so as to provide a signal responsive to the absence of said first portion of filtered reflected radiations denoting absorption thereof by hydrocarbons thereby affording indication of such leaks.

2. The method of detecting leaks in underground pipe lines containing hydrocarbon products which consists of utilizing the infra-red radiation from a solar source projected in proximity of the pipe line, filtering a first portion of the reflected infra-red radiation from an airborne position on a wave length of 3.4 microns capable of absorption by hydrocarbons leaking from the pipe line, filtering a second portion of the reflected infra-red radiation from an airborne position on another wave length, directing the filtered radiation current to a signalling mechanism alternately responsive to the presence of the radiation current to provide a balanced non-signalling condition and the absence of the radiation current from said first portion to maintain an unbalanced signalling condition.

3. The method of detecting leaks of hydrocarbon products from a container which consists of utilizing the reflection of infra-red radiation from a solar source projected in proximity of the container, filtering a first portion of the reflected infra-red radiation on a selected wave length capable of absorption by any hydrocarbons leaking from the container, filtering a second portion of the reflected infra-red radiation on a wave length different from said selected wave length, directing said first and second filtered portions to a signalling device so as to provide a signal responsive to the absence of said first portion of filtered reflected radiations denoting absorption thereof by the hydrocarbons thereby affording indication of leaks.

References Cited in the file of this patent
UNITED STATES PATENTS

| | | |
|---|---|---|
| 2,165,214 | Blau et al. | July 11, 1939 |
| 2,412,165 | McDermott | Dec. 3, 1946 |
| 2,750,511 | Miller | June 12, 1956 |
| 2,764,536 | Hutchins | Sept. 25, 1956 |
| 2,836,726 | Rich | Mar. 27, 1958 |